United States Patent [19]

Uehara

[11] Patent Number: 4,716,477
[45] Date of Patent: Dec. 29, 1987

[54] MECHANISM FOR AUTOMATICALLY LOADING A CASSETTE IN RECORDING AND/OR REPRODUCING APPARATUS INCLUDING PINCHING MEANS FOR APPLYING VARYING PINCHING ACTION

[75] Inventor: Tsukasa Uehara, Tokyo, Japan

[73] Assignee: Canon Kabushiki Kaisha, Tokyo, Japan

[21] Appl. No.: 670,749

[22] Filed: Nov. 13, 1984

[30] Foreign Application Priority Data

| Nov. 15, 1983 [JP] | Japan | 58-213238 |
| Nov. 15, 1983 [JP] | Japan | 58-213239 |
| Nov. 15, 1983 [JP] | Japan | 58-213240 |
| Nov. 15, 1983 [JP] | Japan | 58-213241 |
| Nov. 15, 1983 [JP] | Japan | 58-213242 |

[51] Int. Cl.⁴ .................. G11B 17/04; G11B 15/68
[52] U.S. Cl. .......................... 360/97; 360/85; 360/95; 360/96.5; 360/99
[58] Field of Search ............... 369/270; 360/85, 93, 360/94, 95, 96.5, 96.6, 97, 98, 99

[56] References Cited

U.S. PATENT DOCUMENTS

| 4,096,536 | 6/1978 | Cicatelli | 360/96.5 |
| 4,245,266 | 1/1981 | Bauer | 360/99 |
| 4,246,618 | 1/1981 | Bauer | 360/99 |
| 4,348,704 | 9/1982 | Takagi et al. | 360/96.5 |
| 4,434,444 | 2/1984 | Sato | 360/96.5 |
| 4,546,396 | 10/1985 | Schatteman | 360/97 |

Primary Examiner—Robert S. Tupper
Attorney, Agent, or Firm—Toren, McGeady

[57] ABSTRACT

A record bearing medium cassette loading device for a recording and/or reproducing apparatus including: a cassette carrying device, which includes an elastic member, and a cassette receiving member arranged to have the cassette held between them and which is arranged to be driven to move in the direction of insertion of the cassette; a position restricting member which restricts the position the elastic member in the cassette carrying device; and a driving mechanism for driving the cassette carrying device in the cassette inserting direction. In loading the cassette, the record bearing medium containing cassette is manually pushed in between the elastic member and the cassette receiving member of the cassette carrying device until the elastic member is restricted by the restricting member. Following that, the driving mechanism performs an inward pulling action on the carrying device. During this pulling action, the cassette holding force of the carrying device is increased by causing the restricting member to act on the elastic member.

8 Claims, 14 Drawing Figures

MECHANISM FOR AUTOMATICALLY LOADING A CASSETTE IN RECORDING AND/OR REPRODUCING APPARATUS INCLUDING PINCHING MEANS FOR APPLYING VARYING PINCHING ACTION

BACKGROUND OF THE INVENTION

1. Field of the Invention

This invention relates to a record bearing medium container loading device arranged in a recording and/or reproducing apparatus of the kind using a container or a cassette containing a record bearing medium therein.

2. Description of the Prior Art

Figure 1A:
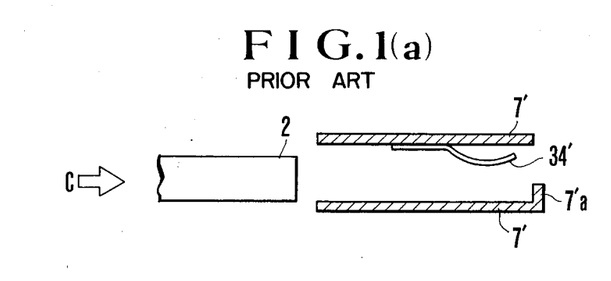
FIG. 1(a) is a side view of a cassette holder showing it as in a state before having a cassette inserted therein.
Figure 1B:
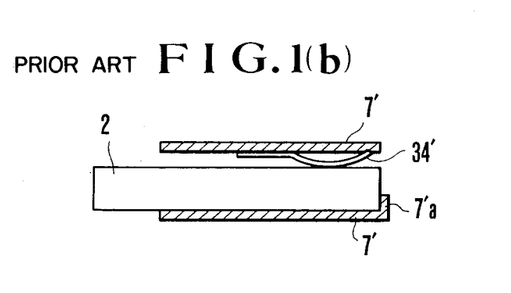
FIG. 1(b) is also a side view of the cassette holder with the cassette completely inserted therein.

Some recording and/or reproducing apparatuses of the kind for recording or reproducing information in or from concentric or helical recording tracks which are formed, for example, on a disc shaped record be ring medium such as a magnetic sheet are arranged to have a cassette which contains the disc shaped record bearing medium inserted from the front side of the apparatus into a cassette holder. This cassette loading arrangement is known as a front loading type. In inserting the cassetta into the cassette holder in the front loading type of device, the cassette is secured to the cassette holder by means of a pinching member disposed at the cassette holder. Referring to FIGS. 1(a) and 1(b) of the accompanying drawings, a leaf spring 34' is disposed at an upper inside part of the cassette holder 7'. With the cassette 2 manually inserted in the direction of arrow C and further pushed inward against the resistance of the leaf spring 34' when the cassette 2 abuts thereon, the cassette 2 is placed under a pressing force of the spring exerted from above. Then, the cassette 2 is further pushed in until it comes to a predetermined position in which further movement of the cassette 2 is restricted by a bent part 7'a of the cassette holder 7'. At this point of time, the cassette 2 is firmly held by the cassette holder 7' under the pressing force of the leaf spring 34'. This arrangement thus necessitates use of a large force for pushing in the cassette 2 against the pressing force exerted by the leaf spring 34' and also for pulling out the cassette 2 from the cassette holder 7' against the pressing force of the leaf spring 34. Therefore, the cassette 2 cannot be smoothly inserted and taken out. This not only degrades the operability of the device but also might damage the cassette.

Figure 2:
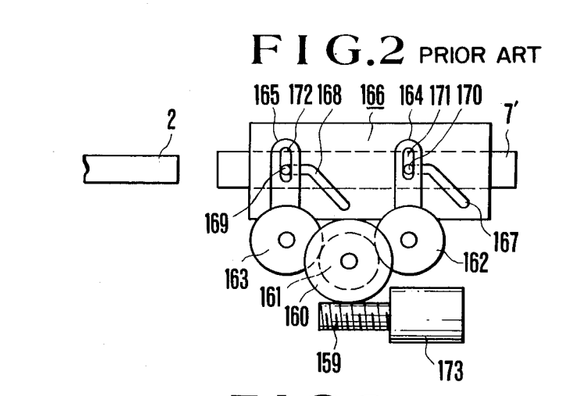
FIG. 2 is a side view of another example of the conventional cassette loading device.

Further, in the case of a cassette loading device of the kind that is arranged as represented by FIG. 2, there arises the following inconvenience: Referring to FIG. 2, a cassette 2 has a magnetic sheet contained therein. A cassette holder 7' is arranged to have the cassette 2 inserted therein. Pins 169 and 170 are provided on the side face of the cassette holder 7'. A slide plate 166 is provided with bent shaped cam slots 167 and 168. The pins 169 and 170 are slidably fitted in the cam slots 167 and 168. The device includes a loading motor 173; a worm gear 159; a worm wheel 160; a gear 161 which is indicated by a broken line and is connected coaxially to the worm wheel 160; and gears 162 and 163 which are engaging the gear 161. The rotating shafts of the gears 162 and 163 are provided with arms 164 and 165. The arms 164 and 165 are provided with vertically extending slots 171 and 172. The pins 170 and 169 are slidably fitted into the slots 171 and 172 via the cam slots 167 and 168.

In loading the cassette 2, the cassette 2 is inserted into the cassette holder 7'. Then, when the loading motor 173 rotates, the rotation torque of the motor 173 is imparted to the worm wheel 160 and the gear 161 via the worm gear 159. They are turned counterclockwise by this torque. The gears 162 and 163 which engage the gear 161 are caused to turn clockwise. The arms 164 and 165 then turn clockwise on the rotating shafts of the gears 162 and 163. As a result of this, the pins 169 and 170 which are disposed on the side face of the cassette holder 7' are guided by the cam slots 168 and 167 and descend while moving to the right. When these pins reach their predetermined positions, a switch (not shown) operates to bring the rotation of the loading motor 173 to a stop. With the cassette holder 7' thus coming down into a predetermined position, the cassette 2 is set into a predetermined loading position. In unloading the cassette 2 from the apparatus, the loading motor 173 is rotated to have the gear arrangement perform its operation in the reverse manner. The cassette 7' is then caused to move upward into another predetermined position.

The loading and unloading operations on the cassette 2 must be gently carried out to avoid any impact on the cassette 2, the cassette holder 7' and parts associated with them. To meet this requirement, the gears 162 and 163 must be of a large diameter to increase their reduction gear ratio relative to the gear 161. Further, since each of the pins 170 and 169 must be moved from one end of the cam slot 167 or 168 to the other end thereof, the arms 164 and 165 must have a certain length which causes an increase in the size of the whole cassette loading device and thus presents a problem in respect to reduction in size of the device.

Figure 3:
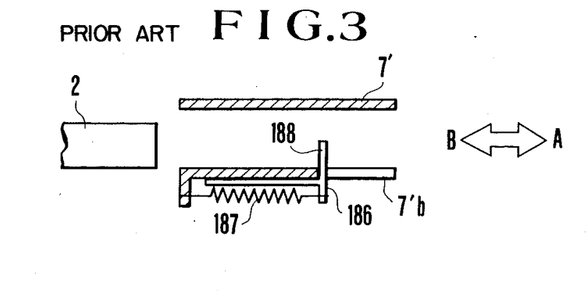
FIG. 3 is a side view of a cassette and a cassette holder showing the cassette inserting operation of a further another example of the conventional cassette loading device.

Further, a cassette loading device of the kind arranged as represented by FIG. 3 presents a problem concerning the cassette unloading operation. Referring to FIG. 3, the illustration includes a cassette 2 which has a magnetic sheet placed therein; a cassette holder 7'; and a slide plate 186 which is arranged to be slidable in the direction of arrow A or B along a slit 7'b of the cassette holder 7'. One end part of the slide plate 186 protrudes into the inside of the cassette holder 7' through the slit 7'b and is provided with an ejecting end 188 which is arranged to abut on the fore end of the cassette 2 on the inserting side thereof. A spring 187 is interposed in between a lower end part of the slide plate 188 and a lower end part of the cassette holder 7' on the cassette inserting side thereof. The slide plate 188 is being urged by this spring 187 to move in the direction of arrow B.

When the cassette 2 is inserted into the cassette holder 7', the fore end on the inserting side of the cassette 2 abuts on the ejecting end 188 of of the slide plate 186. Then, with the cassette 2 is further pushed inward, the slide plate 188 slides in the direction of arrow A against one force of the spring 187. When the cassette 2 is pushed in to a predetermined extent, the cassette 2 is pinched by a pinching arrangement (not shown). The cassette holder 7' descends with the cassette 2 in the pinched state to have the recording and/or reproducing apparatus thus loaded with the cassette 2.

For ejecting the cassette 2, the cassette 2 is released from the pinching action of the pinching arrangement when the cassette holder 7' ascends from tho loading position to the position shown in FIG. 3. With the cassette 2 thus released, a returning force of the spring 187 is exerted on the slide plate 186 to move the cassette 2 by the ejecting end 188 of the plate 187 in the direction of arrow B, so that the cassette 2 is ejected from the holder 7'. With the cassette loading and unloading device arranged in this manner, the cassette 2 is inserted against the force of the spring 187 which is exerted on the slide plate 186. Therefore, during a short period of time before the cassette 2 comes to be pinched by the pinching arrangement, the returning force of the spring 187 tends to slightly move the cassette 2 in the direction of arrow B to bring it away from a correct inserting position. Further, in ejecting the cassette 2, when the cassette 2 is released from the pinching action of the pinching arrangement, the returning force of the spring 187 causes the cassette 2 to suddenly jump out as the force drives the slide plate 166 to quickly slide in the direction of arrow B.

As described above, the cassette loading and unloading devices of the prior art thus have failed to smoothly perform cassette loading and unloading operations.

SUMMARY OF THE INVENTION

It is therefore a general object of the present invention to provide a novel record bearing medium container loading device which is capable of eliminating various shortcomings of the prior art devices mentioned.

It is a specific object of the invention to provide a record bearing medium container or cassette loading device wherein a record bearing medium container or cassette can be inserted into pinching means with a small manual operating force and, after that, the pinching means is caused to perform a pulling action with a larger pinching force in such a manner that the cassette can be surely and safely set in a predetermined loading position.

Under this object, a record bearing medium container or cassette loading device which embodies one of the aspects of this invention and is adapted for use in a recording and/or reproducing apparatus of the kind to be loaded with a record bearing medium container or cassette comprises cassette carrying means which includes an elastic member and a cassette receiving member arranged to have the cassette pinched and sandwiched in between them and is arranged to be driven to move in the direction of inserting the cassette; position restricting means which restricts the position of the elastic member in the cassette carrying means; and driving means for driving the cassette carrying means in the cassette inserting direction. In loading the cassette, the record bearing medium containing cassette is manually pushed in between the elastic member and the cassette receiving member of the cassette carrying means until the elastic member is restricted by the restricting means. Following that, the driving means performs an inward pulling action on the carrying means. During this pulling action, the cassette pinching force of the carrying means is increased with the restricting means arranged to act on the elastic member.

With the embodiment arranged in this manner, it is an advantage of the device that the cassette can be pinched and carried with a sufficiently large force in inserting it with only a small manual operation force being required, so that the cassette can be surely set in a predetermined loading position under a smooth inserting operation without any fear of damaging the record bearing medium containing cassette.

Another specific object of the invention is to provide a record bearing medium container or cassette loading device in which, in loading a recording and/or reproducing apparatus with a record bearing medium container or cassette by moving the cassette in a cassette inserting direction and also in a cassette loading direction differing from the inserting direction, the moving directions can be switched over from one to the other with simplified structural arrangement to permit reduction in size of the recording and/or reproducing apparatus in its entirety and particularly reduction in its thickness.

Under this object, a record bearing medium container or cassette loading device, embodying one of the aspects of this invention applicable to a recording and/or reproducing apparatus of the kind using a record bearing medium container or cassette comprises cassette carrying means which is movable in a cassette inserting direction and also in a cassette loading direction differing from the inserting direction while carrying the cassette; first driving means for moving the carrying means in the cassette inserting direction; second driving means for moving the carrying means in the cassette loading direction; a common drive source for both the first and second driving means; and control means for actuating the second driving means with power supply from the drive source when the cassette carrying means is moved to a predetermined position in the cassette inserting direction by the first driving means which is operated with power supply from the drive source. It is a feature of the embodiment that the driving connection between the cassette carrying means and the first driving means is cut off the instant the carrying means begins to move in the cassette loading direction.

Another embodiment of the invention embodying another aspect thereof applicable to a recording and/or reproducing apparatus using a record bearing medium container or cassette comprises cassette carrying means which is arranged to carry the cassette and is movable in a cassette inserting direction and a cassette loading direction which differs from the inserting direction; driving means for moving the cassette carrying means in the cassette loading direction; a drive source for the driving means; power transmission means arranged between the drive source and the driving means to selectively transmit a driving force from the drive source to the driving means; and control means for causing the power transmission means to transmit a power of the drive source to the driving means when the cassette carrying means is moved to a predetermined position in the cassette inserting direction.

The above-stated power transmission means includes first and second partially toothless gears which respectively have toothless portions and are interconnected with each other. When the carrying means is moved to the predetermined position in the cassette inserting direction, the control means connects the toothed portion of the first toothless gear to a gear provided on the side of the drive source and thus causes the first toothless gear to turn. With the first toothless gear thus turned, the second toothless gear turns to have its toothed portion engage with a gear provided on the side of the above-stated driving means.

An advantageous feature of this embodiment is as follows: The cassette carrying means is moved in the cassette inserting direction and, after that, the record bearing medium containing cassette can be set in the loading position thereof by shifting the moving direction of the cassette carrying means to the cassette loading direction with a simple structural arrangement.

Compared with the conventional device using a swivelling lever for loading the cassette, the arrangement permits reduction in the size of the structural arrangement and eventually contributes to reduction in the thickness and size of a recording and/or reproducing apparatus.

A further specific object of the invention is to provide a record bearing medium container or cassette loading device for a recording and/or reproducing apparatus using a record bearing medium container or cassette, wherein the record bearing medium cassette can be inserted with a small manual inserting force in loading the apparatus with the record bearing medium and the cassette can be safely and surely taken out in unloading the record bearing medium.

Under that object, a record bearing medium containing cassette loading device embodying an aspect of this invention and applicable to a recording and/or reproducing apparatus using a record bearing medium container or cassette comprises cassette carrying means which is arranged to carry the cassette and is movable in a cassette inserting direction; a drive source; and power transmission means arranged between the drive source and the cassette carrying means to transmit a power from the drive source to the cassette carrying means but is not allowed to transmit any power in the reverse direction. With the cassette manually inserted for loading the apparatus with the cassette, the cassette carrying means is shifted from a first position which is located in the cassette inserting direction to a second position. Then, in ejecting the cassette, the power of the drive source is used for moving the cassette from the second position to the first position.

Another embodiment embodying another aspect of the invention applicable to a recording and/or reproducing apparatus using a record bearing medium container or cassette comprises cassette carrying means which is arranged to carry the record bearing medium containing cassette when the cassette is inserted and to be movable in a cassette inserting direction and a direction reverse to the inserting direction; a drive source; and unidirectional power transmission means interposed in between the drive source and the cassette carrying means to permit transmission of power only from the drive source to the cassette carrying means. The unidirectional power transmission means includes a first gear disposed on the side of the drive source; a second gear arranged coaxially with the first gear and to have a cylindrical part; and a coiled spring which is wound around the cylindrical part of the second gear and has one end thereof connected to the first gear. An advantageous feature of this embodiment is as follows: In loading the apparatus with the record bearing medium containing cassette, the cassette carrying means can be pushed in with a small force. In removing the record bearing medium cassette from the carrying means, a power of the drive source is transmitted to the cassette carrying means to move the carrying means to a place where the cassette is to be taken out, so that the cassette can be ejected in a smooth manner.

These and further objects and features of the invention will become apparent from the following detailed description of a preferred embodiment thereof taken in connection with the accompanying drawings.

BRIEF DESCRIPTION OF THE DRAWINGS

FIGS. 1(a) and 1(b) are illustrations of the cassette inserting operation of an example of the conventional device.

DETAILED DESCRIPTION OF THE PREFERRED EMBODIMENTS

Figure 4:
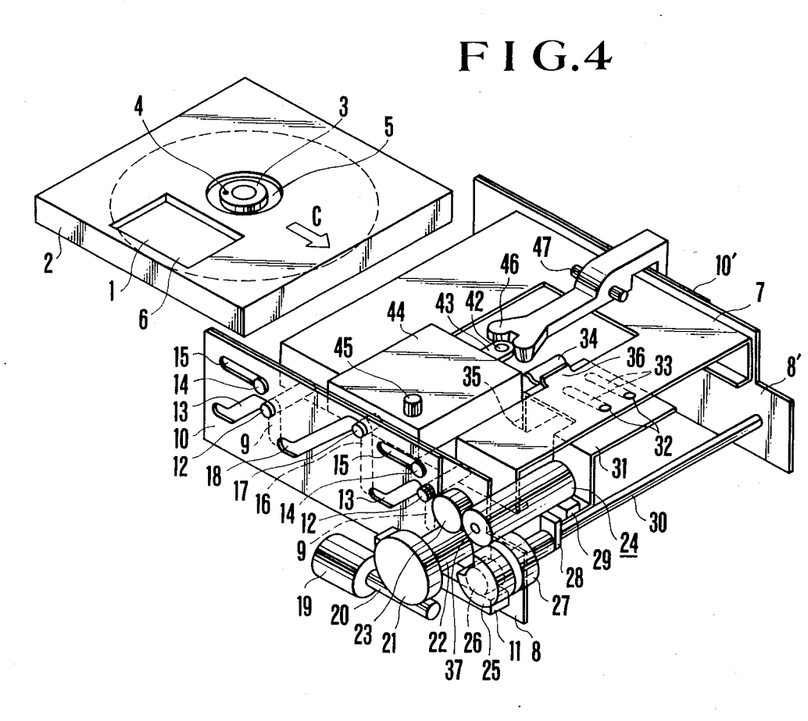
FIG. 4 is an oblique view showing a record bearing medium container loading device arranged according to the present invention as an embodiment thereof.
Figure 5:
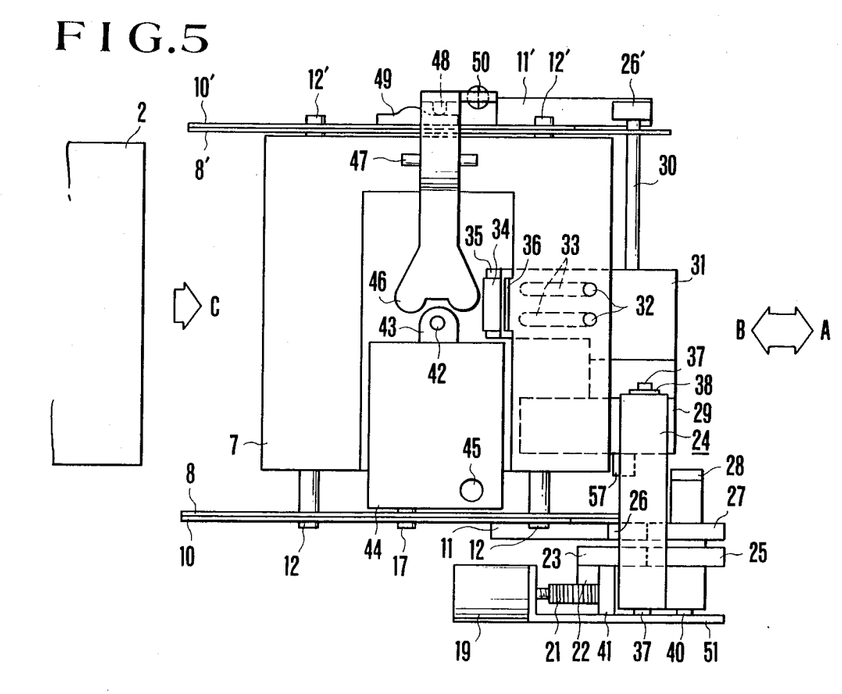
FIG. 5 is a plan view showing the upper side of the embodiment.

In the case of a preferred embodiment of the present invention which will be described below, the invention is applied to a record bearing medium container loading device adapted for use of a cassette containing a magnetic sheet which is a disc shaped record bearing medium. However, the invention is of course not applicable to a device of that kind but also applicable to devices of other kinds that are adapted for use of cassettes containing different record bearing media such as optical or electrostatic capacity type disc or sheet containing cassettes for recording and/or reproducing apparatuses:

Referring to FIGS. 4 and 5 which show the embodiment, the illustrations show a magnetic sheet 1 which is a disc shaped record bearing medium; a cassette 2 which contains the magnetic sheet 1 therein; a center core 3 which is secured to the middle part of the magnetic sheet 1 and is made of a plastic material; a rotation pulse generating pin 4 (hereinafter referred to as a PG pin); a pair of holes 5 provided in the upper and lower sides of the cassette 2 in a position corresponding to the center core 3 of the magnetic sheet 1; a window or opening 6 provided in the upper side of the cassette 2 for allowing a stabilizer which will be described later to be inserted through this opening; and another window or opening (not shown) which is provided in the lower side of the cassette 2 for allowing a magnetic head to be inserted therethrough and is located in a position corresponding to the stabilizer inserting opening 6.

The embodiment is provided with a cassette holder 7 which is arranged to carry the inserted cassette 2 in conjunction with a clamp plate 31 which will be described later. Two pins 12 are provided on one side of the cassette holder 7 while two pins 12' are provided on another side of the holder 7 as shown in FIG. 5. Side plates 8 and 8' are secured by means of screws or the like to a chassis of the body of a recording and/or reproducing apparatus (not shown). These side plates 8 and 8' are disposed on two opposite sides of the cassette holder 7. Two vertically extending slots 9 are provided in each of the side plates 8 and 8'. The side plate 8 is provided with another slot 16 which also extends vertically. These slots 9 and 16 are arranged to permit the pins 12 which are provided on the sides of the cassette holder 7 and a pin 17 which is provided on one side of the stabilizer 44 to be movable up and down respectively. A slide plate 10 is arranged adjacent to the side plate 8 as first moving means and is provided with a rack 11 which is formed in a lower end part of the slide plate 10. The slide plate 10 is provided further with two slots 15 which extend in a horizontal direction; two cam slots 13 which are formed in an S-like shape and arranged to restrict the vertical movement of the cassette holder 7; and a large cam slot 18 which has a shape similar to the cam slots 13 and is arranged to restrict the vertical movement of the stabilizer 44. Another slide plate 10' is likewise provided with a rack 11';, two slots 15, and two cam slots 13 for restricting the vertical movement of the cassette holder 7. Pins 14 are arranged on the side plate 8 to guide and restrict the sliding movement of the slide plate 10 along the side plate 8 and are slidably engaged with the slots 15 of the slide plate 10. The other side plate 8' is likewise provided with pins 14 which engage the slots 15 of the other slide plate 10'. A pin 17 is provided on one side of the stabilizer 44 and slidably engages the slot 16 of the side plate 8 and the cam slot 18 of the slide plate 10. A loading motor 19 is arranged to slide the slide plate 10 and a clamp plate 31 for loading the cassette 2. A worm gear 20 is arranged to be turned by the loading motor 19. A worm wheel 21 engages the worm gear 20. A gear 22 is coaxially connected with the worm wheel 21. A gear 23 engages the gear 22 and is arranged to be turned by a driving torque received from the gear 22 which coaxially turns with the worm wheel 21. A gear unit 24 is arranged to transmit the turning torque of the gear 23 to the clamp plate 31 via a rack 29 which is secured to the clamp plate 31. The gear unit 24 is arranged such that, although it transmits the turning torque of the gear 23 to the rack 29, it does not transmit the movement of the rack 29 to the gear 23 and thus serves as a one-way clutch (as will be further described later with reference to FIGS. 11 and 12). With the rotation of the loading motor 19 transmitted to the rack 11 of the slide plate 10 via the worm gear 20, the worm wheel 21, a first partially toothless gear 25, a second partially toothless gear 27 and a gear 26, the slide plate 10 slides either in the direction of arrow A or in the direction of arrow B as shown in FIG. 5. A series of gear shafts 37, 40 and 41 which are provided for sliding the slide plate 10 and the clamp plate 31 are carried by a chassis 51 as shown in FIG. 5. A lever 28 which is coaxially connected with the first and second toothless gears 25 and 27 is arranged to be turned clockwise when a lever 57 which is provided on one side of the rack 29 secured to the clamp plate 31 moves in the direction of arrow A to come to abut on the lever 28. With the lever 28 thus turned clockwise, the first and second toothless gears 25 and 27 turn clockwise. The first toothless gear 25 then comes to engage the gear 22. The first and second toothless gears 25 and 27 are arranged in one unified body. Referring to FIG. 6(b), the toothless parts of these gears 25 and 27 are arranged to have the same angle in the circumferential direction. However, the end of the toothless part of the first toothless gear 25 in the clockwise direction is ahead of that of the second toothless gear 27 in the clockwise direction. Therefore, when the lever 28 turns clockwise with the lever 57 abutting thereon, the first and second toothless gears 25 and 27 also turn clockwise at the same time as the lever 28. Then, the first toothless gear 25 first comes to engage the gear 22. Following this, the gear 22 turns the first toothless gear 25 clockwise to cause thereby the second toothless gear 27 to engage the gear 26. A reference numeral 30 denotes a rotating shaft which is arranged to connect the gears 26 and 26'. The gear 26 engages the rack 11 provided on the slide plate 10 while the gear 26' engages the rack 11' provided on the other slide plate 10'. With these racks 11 and 11' connected to each other in this manner, the slide plates 10 and 10' are arranged to simultaneously slide in the same direction.

Next, the clamp plate 31 which pinches the cassette 2 and forms the record bearing medium container (or cassette) carrying means for pulling the cassette into the cassette holder 7 is arranged as follows: A leaf spring 34 which is an elastic member and has a free end 34a is attached to the clamp plate 31. The clamp plate 31 is provided also with a cassette receiving part 35 which is formed at a part of the clamp plate 31. The leaf spring 34 and the cassette receiving part 35 of the clamp plate 31 jointly form pinching means for pinching the cassette 2 between them when the cassette 2 is inserted from the outside. Under this condition, when the cassette 2 is manually pushed to move the clamp plate 31 relative to the cassette holder 7 to a point immediately before a restricting part 36 which is arranged at the fore end part of the cassette holder 7 to restrict the position of the free end 34a of the leaf spring 34, a cassette insertion detecting switch which will be described later with reference to FIG. 9 comes to operate with the cassette 2 thus coming to a first position which is immediately before a point where the free end 34a of the leaf spring 34 is restricted by the restricting part 16. With this detection switch having operated, the loading motor 19 turns in a normal direction. The clamp plate 31 is then moved to further pull the cassette 2 inward relative to the cassette holder 7 until the free end 34a of the leaf spring 34 comes to be restricted by the restricting part 36. With the free end 34a thus restricted, the leaf spring 34 further presses the cassette 2 to have it pinched with a greater force.

Figure 7:
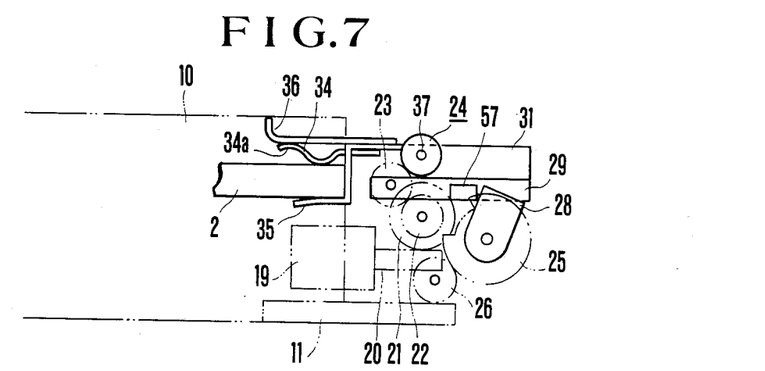
FIG. 7 is a side view showing the cassette inserted and the same gear arrangement in driving operation.

Pins 32 are arranged on the cassette holder 7 to guide the sliding movement of the clamp plate 31 in the direction of arrow A or B. The clamp plate 31 is provided with slots 33 which are formed in a shape extending in the moving direction of the cassette holder 7 and are arranged to engage the pins 32. The leaf spring 34 is attached to the upper fore end part of the clamp plate 31. The cassette receiving part 35 is disposed at the lower fore end part of the clamp plate 31. The leaf spring 34 and the cassette receiving part 35 thus form pinching means and are arranged to have the cassette 2 sandwiched in between them as shown in FIG. 7. The rack 29 is secured to the clamp plate 31 and has the lever 57 arranged on one side thereof. The rack 29 thus moves together with the clamp plate 31 when the latter slides in the direction of arrow A or B. When the clamp plate 31 slides in the direction of arrow A, the rack 29 therefore also moves in the same direction to have the lever 57 abut on the lever 28. This in turn causes the first and second toothless gears 25 and 27 to turn clockwise. The rack 29 engages the gear unit 24. The restricting part 36 is disposed at the fore end part of the cassette holder 7 and is opposed to the leaf spring 34 in a position to restrict the position of the free end 34a of the leaf spring 34 as mentioned in the foregoing.

The gear shafts 37, 40 and 41 which are shown in FIG. 5 are carried by the chassis 51. The gear shaft 37 carries the gear unit 24, the gear shaft 40 carries the first and second toothless gears 25 and 27 and the lever 28 while the gear shaft 41 carries the gear 23. Between the gear unit 24 and the gear shaft 37 is provided a retaining ring 38.

Figure 8:
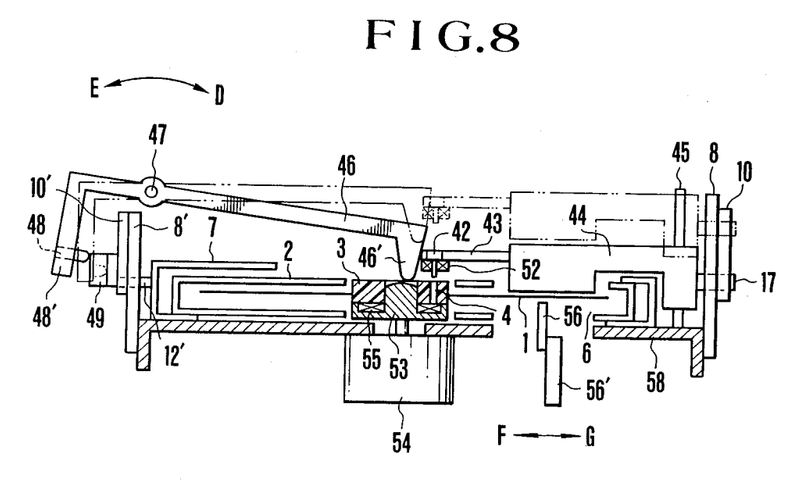
FIG. 8 is a sectional side view showing a center core pressing member and a stabilizer with having the cassette in an initial position and in a loading position.

A detection yoke 42 is arranged as a component member of a pulse generator to detect the PG pin 4 for detecting thereby the rotation phase of the magnetic sheet 1. A supporting arm 43 is attached to the stabilizer 44 and is arranged to carry the detection yoke 42. The arm 43 thus moves upward and downward together with the stabilizer 44. The stabilizer 44 is arranged to come close to the upper surface of the magnetic sheet 1 by descending through the stabilizer inserting window 6 and thus stabilizes the magnetic sheet 1 for the magnetic head 56 which is opposed to the lower surface of the magnetic sheet 1. A guide shaft 45 extends through the stabilizer 44 and is set upright on a mounting chassis 58 (FIG. 8).

A center core pressing member 46 is arranged to push the center core 3 of the magnetic sheet 1 which is placed within the cassette 2 for mounting the center core 3 on a spindle 53 of a sheet rotating motor 54. A shaft 47 pivotally carries the center core pressing member 46 and is secured to a chassis (not shown). A translation cam 49 is secured to one side of the slide plate 10'. A pin 48 is erected on a bent end part 48' of the center core pressing member 46 as shown in FIG. 8. The pin 48 is in touch with the translation cam 49. A spring 50 (FIG. 5) is disposed between the bent end part 48' of the center core pressing member 46 and a chassis (not shown) which is constantly pulling the end part 48' downward, i.e. urging the member 46 to move counterclockwise on the shaft 47.

Figure 6A:
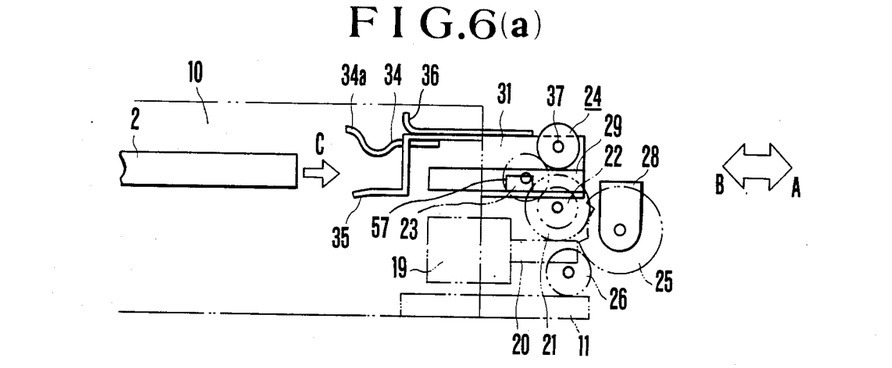
FIG. 6(a) is a side view showing a cassette and a gear arrangement of the same embodiment before the cassette is inserted.
Figure 6B:
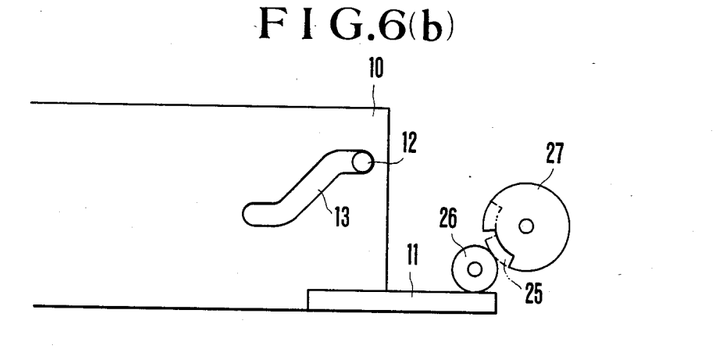
FIG. 6(b) is a side view showing engagement between a part of a second toothless gear and a gear train of the above-stated gear arrangement when the cassette is inserted.

FIGS. 6(a) and 6(b) show the operation of the gears performed at the time of inserting the cassette. The cassette 2 is inserted from the direction of arrow C into the cassette holder 7 as shown in FIG. 6(a). The fore end of the cassette 2 is sandwiched in between the leaf spring 34 provided on the clamp plate 31 and the cassette receiving part 35. Then, the cassette 2 is manually pushed further in the direction of arrow A. At that time, the loading motor 19 has not yet been started. The worm gear 20 which engages the loading motor 19 is engaging the worm wheel 21. The gear 22 which is coaxially connected to the worm wheel 21 is engaging the gear 23 while the gear 23 is engaging the gear unit 24. The lever 57 which is provided on one side of the rack 29 of the clamp plate 31 is in a position as shown in the drawing. Therefore, the lever 28 which is coaxially connected to the first toothless gear 25 is not turned clockwise by the lever 57. Accordingly, the toothless part of the first toothless gear 25 is confronting the gear 22 and the gear 22 is not engaging the first toothless gear 25.

As for the second toothless gear 27, the toothless part thereof is also confronting the gear 26 as shown in FIG. 6(b). Therefore, the gear 26 is not engaging the second toothless gear 27. Since the loading motor 19 has not been started as yet, the slide plate 10 does not slide. The pin 12 which is protruding from the side face of the cassette holder 7 is thus located in the upper part of the cam slot 13. FIG. 7 shows a driving state of the gear arrangement when the loading motor 19 starts operating to pull the cassette 2 inward after the cassette 2 is further manually pushed in the state of being sandwiched in between the leaf spring 34 and the cassette receiving part 35. With the fore end of the cassette 2 sandwiched in between the leaf spring 34 and the cassette receiving part 35 of the clamp plate 31 as shown in FIG. 6(a), when the cassette 2 is further manually pushed in the direction of arrow A, this pushing action causes the clamp plate 31 to slide in the direction of arrow A. The rack 29 also moves in the direction of arrow A. Then, since the gear unit 24 which engages the rack 29 is provided with the one-way clutch, no rotating force is applied to the gear 23. The sliding movement of the clamp plate 31 in the direction of arrow A causes the leaf spring 34 and the cassette receiving part 35 to be pushed in toward the restricting part 36 pinching the cassette 2 between them. The free end 34a of the leaf spring 34 then comes to be restricted to a lower position by the restricting part 36. In other words, with the free end 34a of the leaf spring 34 sufficiently pulled in as shown in FIG. 7, the leaf spring 34 comes to exert a much greater pinching force on the cassette 2. Then, as mentioned in the foregoing, the cassette insertion detecting switch (which will be described further hereinafter with reference to FIG. 9) operates to cause the loading motor 19 to start rotating when the cassette 2 comes to a first position where the free end 34a of the leaf spring 34 is at a point immediately before it comes to be restricted by the restricting part 36.

When the loading motor 19 rotates in the normal direction, its rotation torque is applied to the gear 23 via the worm gear 20 and the worm wheel 21. The gear 23 turns clockwise. The clockwise turn of the gear 23 causes the gear unit 24 to turn counterclockwise. Then, the one-way clutch provided within the gear unit 24 transmits the counterclockwise turn of the gear unit 24 to the rack 29. This moves the second slide plate 31 via the rack 29 further in the direction of arrow A.

On the other hand, the lever 57 which is disposed on one side of the rack 29 also moves in the direction of arrow A and comes to abut on the lever 28 and to turn it clockwise. This causes the first and second toothless gears 25 and 27 to turn clockwise. The first toothless gear 25 then engages the gear 22. The gear 22 causes the first toothless gear 25 to turn clockwise. The second toothless gear 27 is then also caused to turn further clockwise and to engage the gear 26. Therefore, the rotation torque of the loading motor 19 is transmitted to the rack 11 via the worm gear 20, the worm wheel 21, the gear 22, the first and second toothless gears 25 and 27 and the gear 26 and is further transmitted to the rack 11' via the gear 26'. As a result, the slide plates 10 and 10' begin to slide in the direction of arrow A.

FIG. 8 shows further details of the stabilizer 44 and the center core pressing member 46. The sliding action of the slide plate 10 in the direction of arrow A causes the stabilizer 44 to descend from its initial position indicated by a two-dot chain line to a position indicated by a full line moving along a guide shaft 45. Following this downward movement of the stabilizer 44, the detection yoke 42 and the detection coil 52 which form a pulse generator attached to the support arm 43 also come down to confront the PG pin 4 of the center core 3 of the sheet 1.

The center core pressing member 46 turns in the direction of arrow D on the turning center shaft 47 as shown in FIG. 8 by shifting its position from the right-hand side low lift face to the middle high lift face of the translation cam 49 which is secured to one side of the slide plate 10'. The fore end 46' of the center core pressing member 46 then exerts a pushing force on the center core 3 to forcedly fit the core 3 onto the spindle 53. Then, with the translation cam 49 further moving in the direction of arrow A as shown in FIG. 5, the pin 48 is placed on the left low lift face of the translation cam 49. Therefore, the force of the spring 50 brings the center core pressing member 46 back to its original position as shown by the two-dot chain line. With the translation cam 49 thus provided with the low lift face on the left side of the high lift face formed in the middle thereof, the center core pressing member 46 can be kept uplifted from its position indicated by the full line. Therefore, the center core pressing member 46 never imposes any load on the rotation of the magnetic sheet 1. Further, in this case, the translation cam 49 is arranged to actuate the center core pressing member 46 during a remaining portion of the sliding stroke of the slide plate 10' which takes place after the cassette holder 7 has moved down to the loading position, or a second position. A magnet 55 is provided on the spindle 53 for exerting a magnetic attraction on a soft magnetizable member (not shown) which is buried in the center core 3, so that the mounting and positioning action on the center core 3 can be facilitated.

Figure 9:
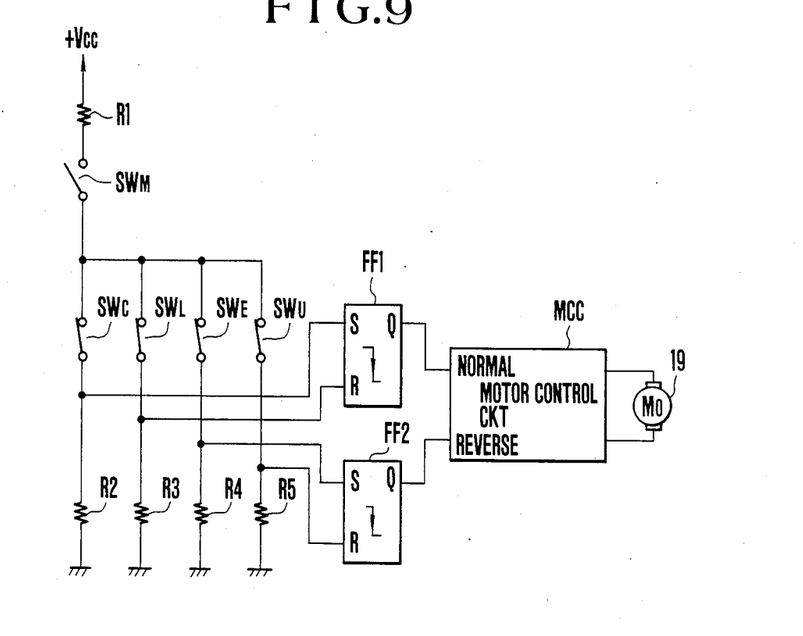
FIG. 9 is a circuit diagram showing the circuit arrangement of a control circuit provided for a loading motor to be used for cassette loading and ejecting operations.

FIG. 9 shows by way of example a control circuit for the loading motor 19 which is provided for loading and ejecting the cassette mentioned in the foregoing.

Referring to FIG. 9, a main switch SWM is connected via a resistor R1 to a power supply +Vcc. A normally closed type cassette insertion detecting switch SWC is disposed, for example, at a part of the cassette holder 7 shown in FIGS. 4 and 5. During the sliding action of the clamp plate 31 in the direction of arrow A, the detecting switch SWC is opened by the clamp plate 31 immediately before the pinching force on the cassette 2 is increased with the free end 34a of the leaf spring engaged with the restricting part 36. The switch SWC is connected in series with the main switch SWM together with a resistor R2. A normally closed type cassette loading completion detecting switch SWL is arranged, for example, to be opened by the slide plate 10 when the slide plate 10 comes to an end of its sliding action in the direction of arrow A. The switch SWL is connected in series with the main switch SWM together with a resistor R3. A normally closed type ejection switch SWE is arranged to be opend by the operation of an eject key (not shown). The switch SWE is connected in series with the main switch SWM together with a resistor R4. A cassette ejection completion detecting switch SWU which is of a normally closed type is disposed, for example, at a part of the cassette holder 7 shown in FIGS. 4 and 5. During the sliding movement of the clamp plate 31 in the direction of arrow B, this switch SWU is opened by the clamp plate 31 after the free end 34a of the leaf spring 34 is disengaged from the restricting part 36 to weaken the pinching force. The cassette ejection completion detecting switch SWU is connected in series with the main switch SWM together with a resistor R5. A first fall-synchronizing type RS flip-flop FF1 is arranged to be set by a shift of a potential at a connection point between the cassette insertion detecting switch SWC and the resistor R2 from a high level to a low level and, after that, to be reset by a shift of a potential of a connection point between the cassette loading completion detecting switch SWL from a high level to a low level. A second fall-synchronizing type RS flip-flop FF2 is arranged to be set by a shift of a potential at a connection point between the ejection switch SWE and the resistor R4 from a high level to a low level and, after that, to be reset by a shift of a potential at a connection point between the cassette ejection completion detecting switch SWU and the resistor R5 from a high level to a low level. A motor control circuit MCC is arranged to cause the loading motor 19 to rotate in the normal direction (to rotate clockwise in the case of the above-stated example) for loading the cassette 2 in response to the high level of the output Q of the first flip-flop FF1 and to cause, in response to the high level of the output Q of the second flip-flop FF2, the motor 19 to rotate in the reverse direction (rotate counterclockwise). The motor control circuit MCC brings the loading motor 19 to a stop in response to the low level of the output Q of the first flip-flop FF1 and the second flipflop FF2.

With the embodiment arranged as described above, in loading the apparatus with the cassette 2, the cassette 2 is inserted after the main switch SWM is closed. When the cassette 2 is pushed in to a certain extent, the clamp plate 31 slides in the direction of arrow A. When the free end 34a of the leaf plate 34 reaches a point immediately before it engages the restricting part 36, the cassette insertion detecting switch SWC opens and the first flip-flop FF1 is set. Accordingly the level of the output Q of the first flip-flop FF1 becomes high,and thereby the motor control circuit MCC causes the loading motor 19 to rotate in the normal direction for the cassette loading. Then, the various actions which have been described in the foregoing are performed for the cassette loading. Upon completion of the cassette loading operation, the slide plate 10 reaches the end point of its sliding action in the direction of arrow A and the cassette loading completion detecting switch SWL is opened. Accordingly, the first flip-flop FF1 is reset and thereby the level of the output Q of the first flip-flop FF1 becomes low. Thus, the motor control circuit MCC brings the rotation of the motor 19 to a stop.

In ejecting the cassette 2, the eject key (not shown) is operated to open the ejection switch SWE. With the switch SWE thus opened, the second flip-flop FF2 is set and the level of its output Q becomes high. In response to this, the motor control circuit MCC causes the loading motor 19 to rotate in the reverse direction for ejecting the cassette 2. Various actions are then performed for ejecting the cassette 2 as described in the foregoing. At the end of the cassette ejecting operation, the clamp plate 31 slides in the direction of arrow B and the free end 34a of the leaf spring 34 disengages from the restricting part 36. A part of the cassette 2 to protrudes from the outside of the recording and/or reproducing apparatus. Then, the cassette ejection completion detecting switch SWU is opened to reset the second flip-flop FF2. Accordingly, the level of the output Q of the second flip-flop FF2 becomes low and thereby the motor control circuit MCC brings the reverse rotation of the loading motor 19 to a stop.

Figure 10:
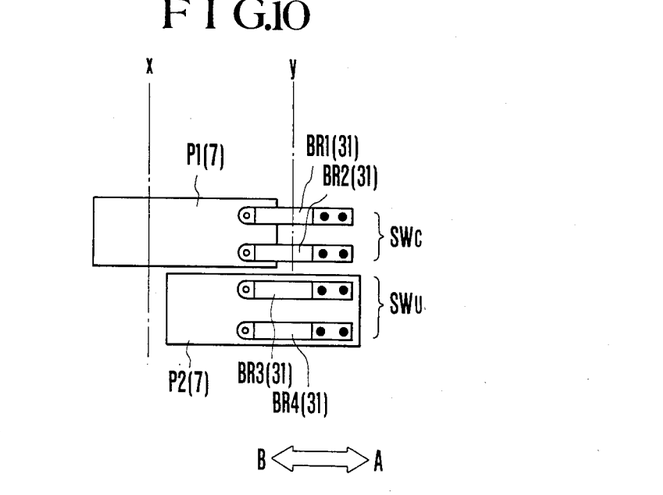
FIG. 10 is an illustration of an arrangement of a cassette insertion detecting switch and a cassette ejection completion detecting switch of the same embodiment.

FIG. 10 shows by way of example the specific arrangement of the above-stated switches SWC and SWU. In this drawing, they are shown as viewed from the lower side of the cassette holder 7. The backside of the upper surface, i.e. the ceiling, of the cassette holder 7 is provided with conductor patterns P1 and P2. The conductor patterns P1 and P2 are arranged on a part convered with an insulator member. On the other hand, sliding brushes BR1-BR4 are secured to the clamp plate 31 by means of some fixing members such as screws or the like. In this case, these brushes BR1-BR4 are arranged on a part of the clamp plate 31 covered with an insulator member. The brushes BR1 and BR2 form the switch SWC and the brushes BR3 and BR4 the switch SWU. A reference symbol "x" indicates a cassette ejection completion point and a symbol "y" indicates a cassette manual insertion completion point. With the switches SWC and SWU arranged in this manner, the brushes BR1-BR4 slide accordingly as the clamp plate 31 slides in the direction of arrow A or B. In the case of sliding in the direction of arrow A, the switch SWC is opened at the manual insertion completion point. In the case of sliding in the direction of arrow B, the switch SWU is opened at the ejection completion point. These switches SWC and SWU may be conversely arranged by having the brushes BR1-BR4 attached to the ceiling of the cassette holder 7 and the conductor patterns P1 and P2 formed on the clamp plate 31.

Figure 11:
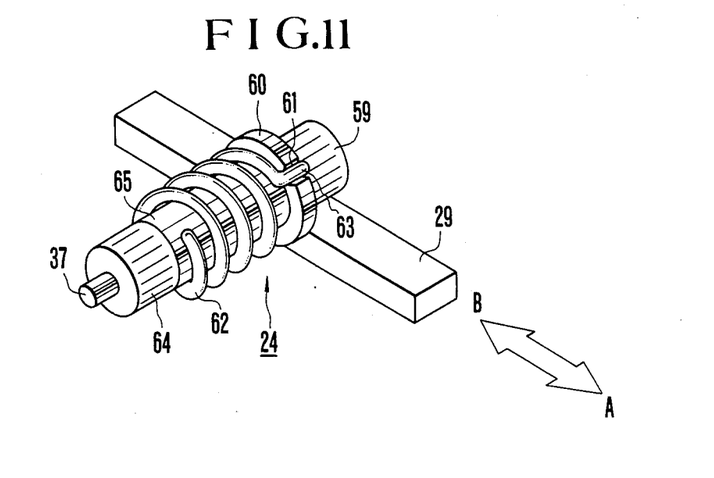
FIGS. 11 and 12 are oblique views showing two examples of an arrangement of a one-way clutch provided in a gear unit of the same embodiment of the invention.

FIG. 11 shows by way of example the arrangement of the gear unit 24 which is provided with the one-way clutch. A rack 29 is arranged on the clamp plate 31. A gear 59 is arranged to engage with the rack 29. A flange 60 which has a notch 61 is formed in one unified body with the gear 59. A coiled spring 62 has a bent part 63 fitted in the notch 61 of the flange 60. A gear 64 is arranged to transmit a driving force and engages with the gear 23 as shown in FIG. 7. A cylindrical part 65 is formed in one unified body with the gear 64. The gear shaft 37 is arranged to have the gear unit 24 which is arranged in this manner carried by the chassis 51 as shown in FIG. 5. The gear unit 24 operates in the following manner:

When the cassette 2 is manually inserted, the rack 29 moves in the direction of arrow A together with the clamp plate 31. This causes the gear 59 to turn counterclockwise on the gear shaft 37. At the same time, the flange 60 which is formed in one unified body with the gear 59 also turns counterclockwise. Accordingly, the coiled spring 62 which has its bent part 63 fitted in the notch part 61 also turns counterclockwise. However, since this turning direction of the coiled spring 62 enlarges the inner diameter thereof, the turning torque is not transmitted to the gear 64 and the cylindrical part 65 which is formed in one unified body with the gear 64. Therefore, the gear 59, the flange 60 and the coiled spring 62 turn in an idle manner. Next, when a turning torque is given to the gear 64 from the gear 23 which engages with the gear 64, the gear 64 turns counterclockwise. Then, the cylindrical part 65 which is formed in one unified body with the gear 64 also turns counterclockwise. This counterclockwise turn of the cylindrical part 65 takes place in such a way as to cause the coiled spring 62 to be wound around the cylindrical part 65. Then, a frictional force is exerted between the coiled sping 62 and the cylindrical part 65 and the inner diameter of the former becomes smaller to have the coiled spring 62 tightly wound around the cylindrical part 65. Then, a driving force is transmitted to the rack 29 via the coiled spring 62, the bent part 63, the notch part 61, the flange 60 and the gear 59. This driving force causes the rack 29 to move in the direction of arrow A.

In ejecting the cassette 2, the gear 64 receives a turning torque from the gear 23 and turns clockwise. This turning direction enlarges the inner diameter of the coiled spring 62. Here, it must be noted that, although the one-way clutch is characterized in that it transmits a driving torque only for rotation in one direction and not for rotation in the reverse direction, it is arranged to be capable of transmitting a driving torque also for reverse rotation if a load imposed on the gear which is receiving the driving force is larger than a load on the gear disposed on the idle rotation side. Therefore, the rack 29 can be shifted in the direction of arrow B with an idle turning torque brought about by arranging a load which is imposed on the side of the gear 64 by the gear train consisting of the gears 23 and 22, the worm wheel 21, the worm gear 20 and the first and second toothless gears 25 and 27 to be larger than a load imposed by some frictional force between the coiled spring 62 and the cylindrical part 65, the weight of the cassette 2 on the rack 29, a frictional force between the clamp plate 31 and the cassette holder 7, etc.

Figure 12:
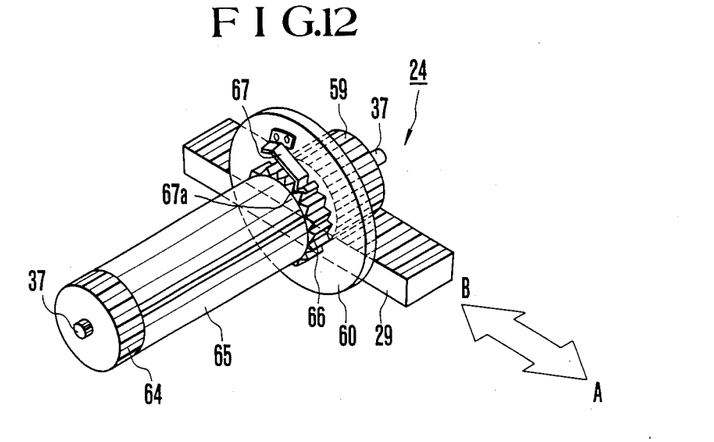

The gear unit 24 may be also arranged as shown in FIG. 12. In the case of FIG. 12, the cylindrical part 64 which is formed in one unified body with the gear 64 serving as a first gear on the side of the drive source (the loading motor 19) is provided with a toothed part 66. The toothed part 66 is formed in one unified body with the cylindrical part 65 in a part close to one end opposite to the other end where the gear 64 is formed. On the other hand, the flange part 60 which is formed in one unified body with the gear 59 serving as a second gear on the side of the rack 29 is provided with a leaf spring 67. The leaf spring 67 is arranged on the flange surface to engage with the above-stated toothed part 66 at an engaging part 67a. The engaging part 67a of the leaf spring 67 engages with the root of the toothed part 66 by virtue of the resilience of the leaf spring 67.

In inserting the cassette 2, when the rack 29 is pushed in the direction of arrow A as a result of a manual operation on the cassette 2, the gear 59 and the flange 60 are turned counterclockwise. However, since the loading motor 19 is not operating, the gear 64, the cylindrical part 65 and the toothed part 66 do not rotate, and the engaging part 67a of the leaf spring 67 slides over the toothed part 66.

Following this, the loading motor 19 is driven to rotate in the cassette inserting direction. This causes the gear 64, the cylindrical part 65 and the toothed part 66 to turn counterclockwise. The flange 60 and the gear 59 are then caused to turn in the same direction by the engagement between the root of the toothed part 66 and the engaging part 67a of the leaf spring 67. The turn of the gear 59 moves the rack 29 further in the direction of arrow A.

In ejecting the cassette 2, the loading motor 19 rotates in the cassette ejecting direction to cause the gear 64, the cylindrical part 65 and the toothed part 66 to turn clockwise. Therefore, the flange part 60 and the gear 59 are caused to turn in the same direction through the engagement between the engaging part 67a of the leaf spring 67 and the root of the toothed part 66. This movement of the gear 59 then moves the rack 29 in the direction of arrow B.

The resilience of the leaf spring 67, the shape of the engaging part 67a of the leaf spring 67 and the shape of the toothed part 66 must be determined to permit transmission of a sufficiently large torque to overcome a load imposed on the gear 59 by the clamp plate 31, the weight of the cassette 2 on the clamp plate 31 and friction between parts when the rack 29 is moved in the direction of arrow A or B in inserting or ejecting the cassette 2 by the loading motor 19.

Cassette Loading Operation

The cassette loading operation of the embodiment is performed in the following manner: Referring to FIG. 6, the cassete 2 is manually inserted from the direction of arrow C into the cassette holder 7 to haYe the fore end part of the cassette 2 sandwiched in between the leaf spring 34 and the cassette receiving part 35. When the cassette 2 is then pushed in by hand further in the direction of arrow A, the clamp plate 31 is caused by this to slide in the direction of arrow A along the slot 33 which slidably engages with the pin 32 attached to the cassette holder 7. At that time, the rack 29 which is secured to the clamp plate 31 also moves in the direction of arrow A. However, the one-way cluth provided in the gear unit 24 which engages with the rack 29 prevents the driving torque of the rack 29 from being applied to the gear 23. When the cassette 2 is further pushed by hand in the direction of arrow A with the cassette 2 in the state of being sandwiched in between the leaf spring 34 and the cassette receiving part 35, the cassette insertion detecting switch SWC (see FIG. 9) comes to operate at a point (the first position) immediately before the free end 34a of the leaf spring 34 is pushed down by the restricting part 36. With the switch SWC operated, the loading motor 19 comes to rotate in the normal direction (clockwise rotation, for example). The rotation of the motor 19 in the normal direction gives a counterclockwise turning torque via the worm gear 20 to the worm wheel 21 and the gear 22, clockwise turning torque to the gear 23 and a counterclockwise turning torque to the gear unit 24. Then, the one-way clutch which is provided within the gear unit 24 transmits the rotation of the gear 23 to the rack 29 to move it in the direction of arrow A. With the rack 29 moved by the gear unit 24, the clamp plate 31 slides in the direction of arrow A along the slot 33 which is slidably engaging with the pin 32. During this process, the restricting part 36a acts on the free end 34a of the leaf spring 34 to increase a pinching force on the cassette 2 which is sandwiched in between the leaf spring 34 and the cassette receiving part 35.

Their initial positions of the first and second toothless gears 25 and 27 are defined by a spring and a positioning member (not shown) to have the toothless part of the first toothless gear 25 opposed to the gear 22 and the toothless part of the second toothless gear 27 to the gear 26 as shown in FIGS. 6(a) and 6(b). Accordingly, the turn of the gear 22 does not cause the first and second toothless gears 25 and 27 to turn under that condition.

The lever 57 moves in the direction of arrow A as the rack 29 moves in the same direction. The lever 57 comes to abut on the lever 28 to cause it to turn clockwise as shown in FIG. 7. Then, the first and second toothless gears 25 and 27 which are coaxially connected to the lever 28 turn clockwise together. With the toothless gears 25 and 27 turning clockwise, the first toothless gear 25 first comes to engage with the gear 22 which is turning counterclockwise and is thus caused to turn clockwise by the gear 22. This in turn causes the second toothless gear 27 also to turn clockwise to come to engage with and turn the gear 26 counterclockwise. With the gear 26 turned counterclockwise, the rack 11 is moved in the direction of arrow A. The other slide plate 10' is also caused to move in the direction of arrow A. The rotation torque of the gear 26 is transmitted via the rotation shaft 30 to the gear 26' which engages with the rack 11' of the slide plate 10'. This causes the slide plate 10' to slide in the direction of arrow A. The translation cam 49, therefore, also moves in the direction of arrow A.

The pins 12 which extend from the side faces of the cassette holder 7 and the pin 17 which extends from one side of the stabilizer 44 are guided by the slots 9 and 16 and the cam slots 13 and 18 and move downward. Accordingly, the cassette holder 7 and the stabilizer 44 begin to descend. Since the pins 32 which protrude from the cassette holder 7 are engaging with the slots 33, the clamp plate 31 begins to descend together with the cassette holder 7. At the same time, the rack 29 also begins to descend. The descent of the rack 29 disengages the rack 29 from the gear unit 24 and the sliding movement of the clamp plate 31 in the direction of arrow A comes to a stop. The slide plate 10 continues to move in the direction of arrow A as the rotation torque of the loading motor 19 is continuously transmitted to its rack 11 via the worm gear 20, the worm wheel 21, the gear 22, the first and second toothless gears 25 and 27 and the gear 26. Therefore, the cassette holder 7 and the stabilizer 44 descend and come to a stop when the cassette holder 7 reaches the loading position, or the second position.

Next, the operations of the center core pressing member 46 and the stabilizer 44 will be described below with reference to FIGS. 5 and 8.

The rotation or turning torque of the loading motor 19 is transmitted to the gear 26 via the worm gear 20, the worm wheel 21, the gear 22 and the first and second toothless gears 25 and 27. The rotation torque of the gear 26 is imparted to the gear 26' via the rotation shaft 30. This causes the slide plate 10' to be moved in the direction of arrow A via the rack 11'. The translation cam 49 which is attached to one side of the slide plate 10' also moves in the direction of arrow A. After the cassette holder 7 has come down to the loading position, the high lift face of the translation cam 49 comes to act on the pin 48 of the center core pressing member 46. Then, the pressing member 46 turns on the shaft 47 in the direction of arrow D as shown in FIG. 8 from the position indicated by a two-dot chain line to the position indicated by a full line. The fore end 46' of the pressing member 46 then applies a pushing force to the center core 3 to forcedly fit the center core 3 onto the spindle 53 of the magnetic sheet rotating motor 54. Following this, when the slide plate 10 moves further in the direction of arrow A, the pin 48 comes to a low lift face of the translation cam 49. This causes the center core pressing member 46 to turn in the direction of arrow E and come back to the position indicated by the two-dot chain line.

On the other hand, during the descent of the cassette holder 7, the sliding movement of the slide plate 10 in the direction of arrow A causes the stabilizer 44 to be moved down along the guide shaft 45 from a position indicated by a two-dot chain line to another position indicated by a full line. In the full line position, the stabilizer 44 is located close to the upper surface of the magnetic sheet 1 and serves to stabilize the magnetic sheet 1 relative to the magnetic head 56 when the former is rotated. When the slide plate 10 comes to the end of the sliding movement thereof in the direction of arrow A, the cassette loading completion detecting switch SWL (see FIG. 9) operates to bring the rotation of the loading motor 19 to a stop. After that, the sheet rotating motor 54 is rotated to rotate the magnetic sheet 1 The magnetic head 56 then performs recording or reproduction on or from the magnetic sheet 1. In recording or reproduction, a head shifting carriage 56' continuously or intermittently shifts the magnetic head 56 in the radial direction of the magnetic sheet 1 as indicated by arrows F and G in FIG. 8.

Cassette Ejecting Operation: When an eject key or the like (not shown) is operated, the rotation of the sheet rotating motor 54 comes to a stop. Then, the ejection switch SWE (see FIG. 9) operates to cause the loading motor 19 to begin to rotate in the direction reverse to the direction in which is rotates for cassette loading or, for example, in the counterclockwise direction. With the loading motor 19 thus rotating counterclockwise, the worm wheel 21 and the gear 22 are caused to turn clockwise via the worm gear 20. The clockwise rotation of the gear 22 causes the gear 23 and the first and second toothless gears 25 and 27 to turn counterclockwise. Then, the counterclockwise rotation of the gear 23 causes the gear unit 24 to turn clockwise. The counterclockwise rotation of the second toothless gear 27 is transmitted to the gears 26 and 26' to cause them to turn clockwise. The clockwise rotation of the gears 26 and 26' causes the racks 11 and 11' to begin to move in the direction of arrow B. The slide plates 10 and 10' likewise begin to slide in the direction of arrow B. With the slide plate 10' sliding in this manner, the translation cam 49 moves in the direction of arrow B and the pin 48 (FIG. 5) shifts its position from the low lift cam face on the left-hand side to the high lift cam face of the translation cam 49. This causes the center core pressing member 46 to turn in the direction of arrow D from the position indicated by the two-dot chain line to the position indicated by the full line. Then, further movement of the translation cam 49 in the direction of arrow B brings the pin 48 to the low lift cam face on the right-hand side of the translation cam and thus brings the pressing member 46 back to the position indicated by the two-dot chain line in FIG. 8. Following that, the pins 14 which are provided on the sides of the cassette holder 7 and the pin 17 provided on one side of the stabilizer 44 begin to move upward being guided by the slots 9 and 16 side plate 8 and the cam slots 13 and 18 of the slide plate 10. This causes the cassette holder 7 and the stabilizer 44 to ascend.

With the slide plates 10 and 10' sliding in the direction of arrow B in this manner, the center core pressing member 46 comes back to its original position. Following this, the cassette holder 7 and the stabilizer 44 ascend to come back to their initial positions. At this point of time, the gear 26 which is turning clockwise and the second toothless gear 27 which is turning counterclockwise are disengaged from each other by the toothless part of the second toothless gear 27. This disengagement cuts off the driving torque transmission. Therefore, the slide plates 10 and 10' stop sliding.

The clamp plate 31 also ascends with the cassette holder 7. The rack 29 again engages with the gear unit 24. Since the gear unit 24 is turning clockwise this time unlike in the case of descent of the cassette holder 7, the rack 29 is moved in the direction of arrow B. Since the gear unit 24 is provided with the one-way clutch, the movement of the rack 29 in the direction of arrow B requires use of the idle rotation torque of this one-way clutch. For this purpose, the necessary rotation torque can be imparted to the rack 29 without hindering the cassette ejecting operation at all by apposite design of the embodiment taking into consideration the load consisting of the weight of the cassette 2, friction between the clamp plate 31 and the cassette holder 7, etc.

Since the first toothless gear 25 is still engaging with the gear 22 even after the second toothless gear has been disengaged from the gear 26 as mentioned above, the clockwise rotation of the gear 22 causes the first and second toothless gears 25 and 27 and the lever 28 to turn counterclockwise together. The toothless part of the first toothless gear 25 then comes to confront the gear 22 to disengage thereby the first toothless gear 25 from the gear 22. The transmission of a driving force to the first toothless gear 25 is then cut off. The first and second toothless gears 25 and 27 are then brought back to their initial positions as shown in FIGS. 6(a) and 6(b) by means of a spring and a positioning member (not shown).

On the other hand, since the loading motor 19 is still rotating, the rack 29 is moved further in the direction of arrow B by the gear unit 24. The clamp plate 31 also slides in the direction of arrow B. The leaf spring 34 and the cassette receiving part 35 move from their positions shown in FIG. 7 to the positions shown in FIG. 6(a). This brings the cassette 2 to a position sufficiently protruding from the recording and/or reproducing apparatus. With the cassette 2 coming to this position, the cassette ejection completion detecting switch SWU (see FIG. 9) operates to bring the rotation of the loading motor 19 to a stop. Then, the cassette ejecting operation comes to an end.

While a preferred embodiment has been described in the foregoing, this invention is, of course, not limited to this embodiment. Various modifications and variations may be made in the invention without departing from the scope of the subjoined claims.

What is claimed is:

1. In an apparatus using a record bearing medium container, a record bearing medium container loading device comprising:
   container holding means having an elastic member and a container receiving member, said holding means pinching said container elastically between the elastic member and the container receiving member;
   control means for controlling the pinch force of said elastic member of said holding means against the container pinched thereby; and
   driving means for automatically carrying said container holding means into the apparatus in a predetermined inserting direction;
   wherein the control means increase said pinching force of said elastic member against the container pinched between said elastic member and said container receiving member as said driving means moves the container holding means into the apparatus.

2. Apparatus according to claim 1, wherein said recording medium is a magnetic disc.

3. Apparatus according to claim 1, wherein said control means includes a member for controlling the pressure of said elastic member by pressing said elastic member on a side remote from the container.

4. Apparatus according to claim 1, wherein said driving means moves the container in two different directions into and out of the apparatus.

5. A cassette loading apparatus, comprising:
   (a) an opening for receiving said cassette,
   (b) pinch means for pinching said cassette inserted through said opening,
   (c) loading means for automatically loading said cassette from a first position at which the cassette can be inserted into the pinch means through the opening to a predetermined operating position as said cassette is pinched by said pinch means; and
   (d) control means for controlling the pinch force of said pinch means on said cassette, said control means strengthening the pinch force of said pinch means as said loading means moves the cassette toward the operating position.

6. An apparatus according to claim 5, wherein said cassette is a magnetic record bearing medium.

7. An apparatus according to claim 5, wherein said pinch means includes an elastic member which acts on one side of said cassette.

8. An apparatus according to claim 7, wherein said control means includes a member for controlling the pressure of said elastic member by pressing said elastic member on a side remote from the container.

* * * * *